US006621645B2

United States Patent
Sato

(10) Patent No.: US 6,621,645 B2
(45) Date of Patent: Sep. 16, 2003

(54) SUPER WIDE-ANGLE LENS AND PHOTOGRAPHING APPARATUS HAVING THE SAME

(75) Inventor: Haruo Sato, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 48 days.

(21) Appl. No.: 09/892,780

(22) Filed: Jun. 28, 2001

(65) Prior Publication Data

US 2002/0057505 A1 May 16, 2002

(51) Int. Cl.[7] .............................. G02B 9/00; G02B 9/04
(52) U.S. Cl. ........................ 359/749; 359/793
(58) Field of Search ..................... 359/749, 750, 359/751, 752, 753, 793

(56) References Cited

U.S. PATENT DOCUMENTS

| | | | | |
|---|---|---|---|---|
| 4,957,355 A | * | 9/1990 | Sato | 359/708 |
| 5,251,073 A | * | 10/1993 | Schauss | 359/715 |
| 5,477,388 A | * | 12/1995 | Ishiyama et al. | 359/749 |
| 5,477,389 A | * | 12/1995 | Ito et al. | 359/752 |
| 5,724,195 A | * | 3/1998 | Enomoto et al. | 359/752 |
| 2002/0057505 A1 | * | 5/2002 | Sato | 359/753 |

FOREIGN PATENT DOCUMENTS

| | | |
|---|---|---|
| JP | 9-113798 | 5/1997 |
| JP | 9-113800 | 5/1997 |
| JP | 10-325923 | 12/1998 |
| JP | 2001-159732 | 6/2001 |

* cited by examiner

Primary Examiner—Georgia Epps
Assistant Examiner—David N. Spector
(74) Attorney, Agent, or Firm—Miles & Stockbridge P.C.

(57) ABSTRACT

In order to provide a large relative-aperture super wide-angle lens having the inclusive angle of 2 ω=115° or more with the conventional projection method (y=f·tan θ) having the relative-aperture of about F 2.8, having compactness and high optical performance, and having small variation of aberration in relatively close object distance, the lens includes, in order from the object, a divergent lens group Gn having negative refractive power and a convergent lens group Gp having positive refractive power, and the divergent lens group Gn includes at least one aspherical negative lens, and the aspherical lens satisfies predetermined conditional expressions.

19 Claims, 6 Drawing Sheets

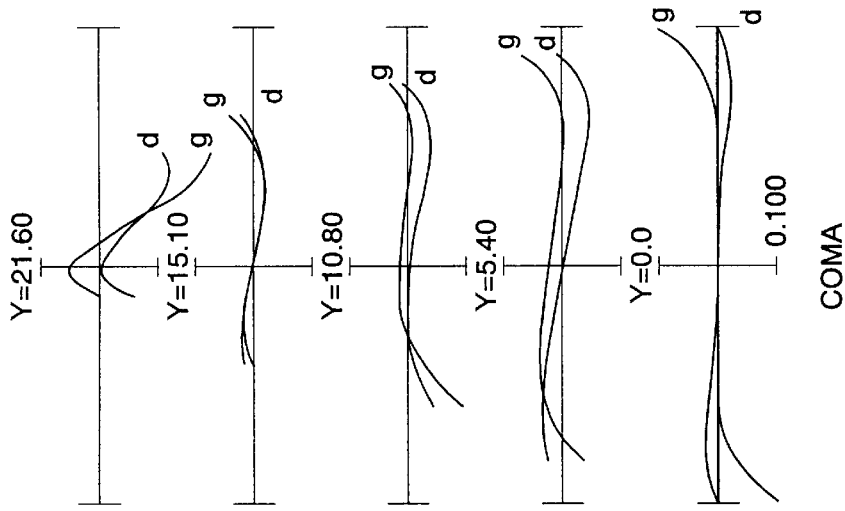
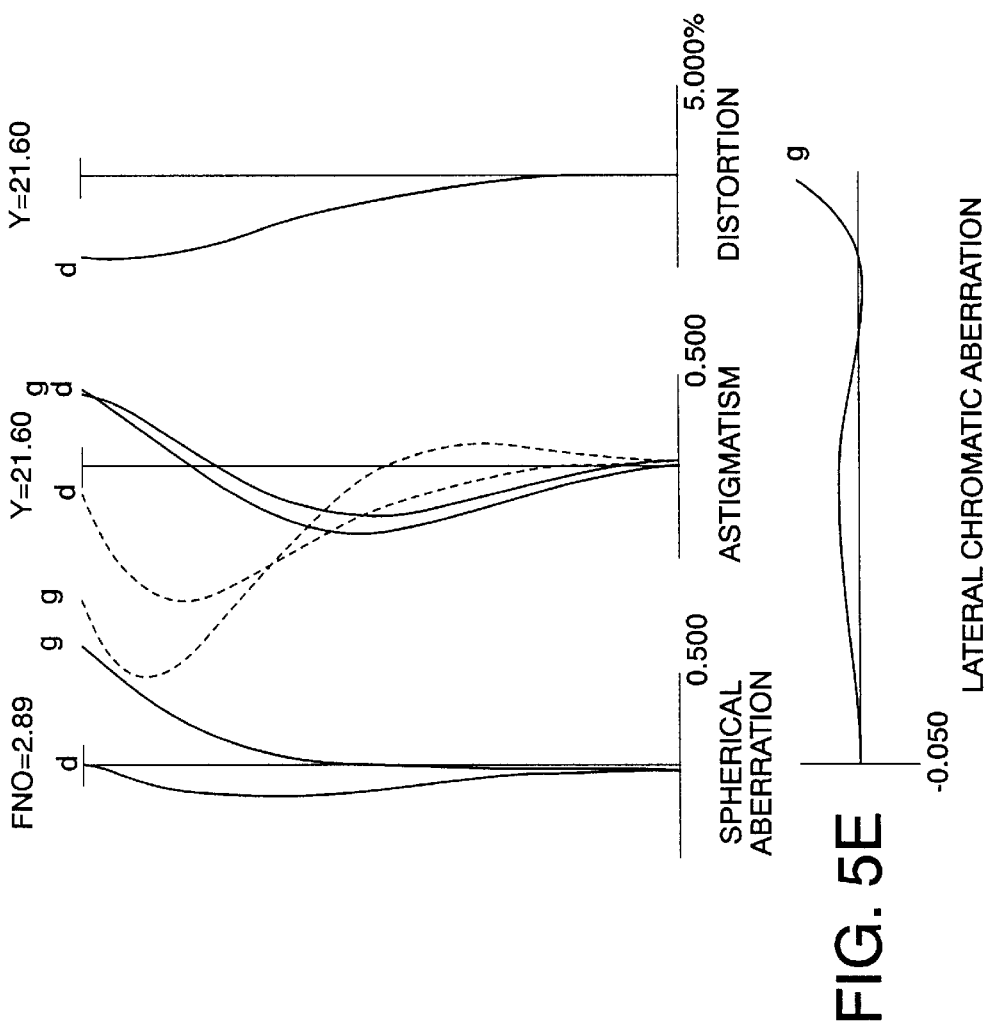

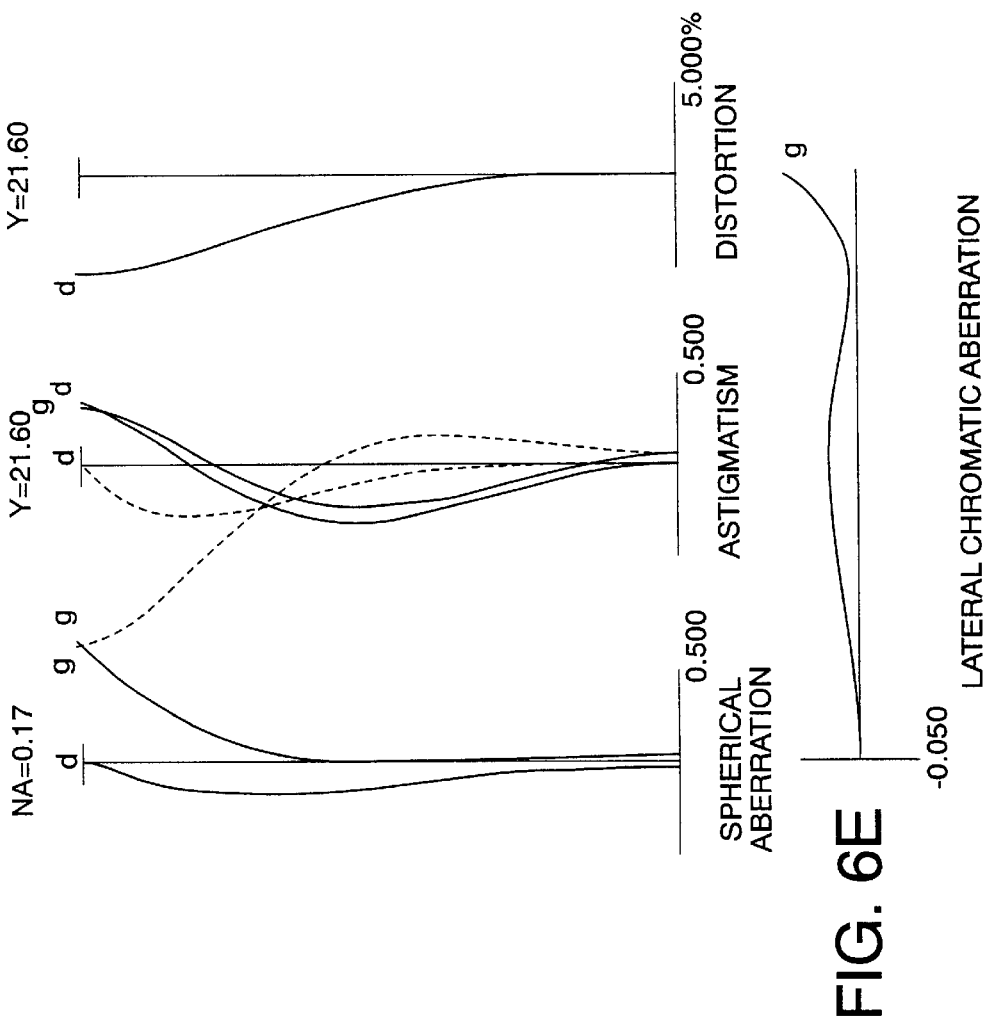

SUPER WIDE-ANGLE LENS AND PHOTOGRAPHING APPARATUS HAVING THE SAME

INCORPORATION BY REFERENCE

The disclosures of the following priority application is herein incorporated by reference:

Japanese Patent Application No. 11-343694 filed Dec. 2, 1999.

BACKGROUND OF THE INVENTION

1. Field of the Invention

The present invention relates to a wide-angle lens and, in particular, relates to a super wide-angle lens having a large relative-aperture and a large angle of view.

2. Description of Related Art

In conventional projection method, when the image height is denoted by y, the focal length of a lens is denoted by f, and an angle formed by an object measured from the optical axis is denoted by $\theta$, the expression $y=f \cdot \tan \theta$ is satisfied. In this method, although a proposal of a super wide-angle lens having the inclusive angle (angle of view) of $2\omega=110°$ or more has been rare, and a proposal of a super wide-angle lens having the relative-aperture of F 3.5 or less has been very rare, lenses proposed by, for example, Japanese Patent Application No. 9-113798 and by Japanese Patent Application No. 9-113800 filed by the same assignee of the present application have been known.

Moreover, although a proposal of a super wide-angle lens having the inclusive angle of $2\omega=115°$ or more with the conventional projection method, which satisfies $y=f \cdot \tan \theta$, and having the relative-aperture of F 3.5 or less has been very rare, Japanese Patent Application No. 10-325923 filed by the same assignee of the present application, for example, has proposed a lens having the inclusive angle of $2\omega=115°$ or more and the relative-aperture of F 3.5 or less.

However, a super wide-angle lens having the inclusive angle of $2\omega=115°$ or more with the conventional projection method, which satisfies $y=f \cdot \tan \theta$, and having the relative-aperture of about F 2.8 has not been proposed, and not been commercialized. In this situation with the present inventor's exertion and diligence, an optical system is obtained that has the inclusive angle (angle of view) of $2\omega=118°$ or more with the conventional projection method, which is almost limit with the projection method and has not existed, and also has a large relative-aperture of F 2.8.

Problems for developing such an optical system are compactness to be able to use regularly, high optical performance, securing a peripheral quantity of light, and productivity of an aspherical surface. It is particularly important whether an aspherical lens to be used can be produced by using current mass production technique or not. In considering manufacturing method, instead of using a fine ground aspherical surface, which has not good productivity, to be able to use a glass molding method, which has high productivity, is directly connected to reducing costs, and is even advantageous to the user. In considering from this point of view, the aforementioned Japanese Patent Application No. 9-113798 or Japanese Patent Application No. 9-113800 proposed an optical system having a field of view of $2\omega=105.6°$ and the relative-aperture of F 2.87. However, aspherical lenses proposed in these optical systems have been difficult to be manufactured by using a fine ground method or a glass molding method and, as a result, productivity has been low. The angle of view has been only about 105°, so that it has been insufficient. If the angle of view is made wider without taking measures, then the aspherical lens will become even more difficult to be manufactured.

Japanese Patent Application No. 10-325923 proposed a large relative-aperture super wide-angle lens having the angle of view of $2\omega=118°$ and the relative-aperture of F 2.9. However, an aspherical lens located to an object side of the lens system was more difficult to be manufactured than the optical system described above, so that the productivity of the lens system was low. Moreover, the optical performance was insufficient, focusing method had a disadvantage, and the size was large.

SUMMARY OF THE INVENTION

The present invention is made in view of the aforementioned problem and has an object to provide a large relative-aperture super wide-angle lens having the inclusive angle (angle of view) of $2\omega=115°$ or more with the conventional projection method, which satisfies $y=f \cdot \tan \theta$, having the relative-aperture of about F 2.8, having compactness and high optical performance, and having small variation of aberration in relatively closed object distance.

In order to solve the problems described above, the present invention has, in order from the object, a divergent lens group having negative refractive power, and a convergent lens group having positive refractive power. The divergent lens system includes at least one negative aspherical lens element, and the aspherical lens satisfies the following conditional expressions (1) and (2):

$$0 < \frac{(d_{\phi max} - d_0)/h_{max}}{(d_{30} - d_0)/h_{30}} < 3 \tag{1}$$

$$-15 < f_{asp}/f_0 < -1.7 \tag{2}$$

where $d_0$ denotes the thickness of the aspherical lens along the optical axis (center thickness), $d_{\phi max}$ denotes the thickness of the aspherical lens parallel to the optical axis at the height of the maximum effective aperture on the image side surfacer $d_{30}$ denotes the thickness of the aspherical lens parallel to the optical axis at the height of 30% of the maximum effective aperture when the maximum effective aperture on the image side surface is assumed to be is 100%, $h_{max}$ denotes the maximum effective radius of the aspherical lens on the image side surface, $h_{30}$ denotes the 30% of the maximum effective radius of the aspherical lens when the maximum effective aperture on the image side surface is assumed to be 100%, $f_{asp}$ denotes the paraxial focal length of the aspherical lens, and $f_0$ denotes the focal length of the super wide-angle lens.

In the present invention, there are at least two aspherical surfaces in the divergent lens group, and the most object side aspherical surface preferably has a third order term satisfied with conditional expression (3) when the aspherical surface is expressed by the following aspherical expression (A):

$$X(y)=(y^2/r)/[1+(1-\kappa \cdot y^2/r^2)^{1/2}]+C2 \cdot y^2+C3 \cdot |y|^3+C4 \cdot y^4+C6 \cdot y^6 C8 \cdot y^8+ \\ \cdot y^8+C10 \cdot y^{10}+C12 \cdot y^{12}+C14 \cdot y^{14}+C16 \cdot y^{16} \tag{A}$$

$$1 \times 10^{-6} \le |C3| < 1 \times 10^{-2} \tag{3}$$

where $X(y)$ denotes the distance (sag amount) between the tangent plane to the vertex of the aspherical surface and the aspherical surface along the optical axis at the height y vertical from the optical axis, r denotes the reference radius of curvature, κ denotes a conical coefficient, and Cn denotes the aspherical coefficient of n-th order.

In the present invention, the super wide-angle lens having the inclusive angle of the lens system of 2 ω=110° or more includes, in order from the object, a divergent lens group having negative refractive power, and a convergent lens group having positive refractive power. The divergent lens group includes, in order from the object, a negative meniscus lens having a convex surface facing to the object side, and a negative aspherical lens having at least one surface located to the image side with an aspherical shape that the radius of curvature becomes weak from the optical axis to the periphery. The aspherical lens satisfies the aforementioned conditional expression (1).

Moreover, the present invention has at least one focusing lens group for focusing to a near-distant object in the convergent lens group having positive refractive power, and the following conditional expression (4) is preferably satisfied:

$$3 < f_x/f_0 < 12 \qquad (4)$$

where $f_x$ denotes the focal length of the focusing lens group, or that having the shortest focal length when a plurality of focusing lens groups are there, and $f_0$ denotes the focal length of the whole system of the super wide-angle lens.

Furthermore, the present invention provides a photographing apparatus using the aforementioned super wide-angle lens.

BRIEF DESCRIPTION OF THE DRAWINGS

FIGS. 5A–5E are graphs showing various aberrations according to the second embodiment when the lens is focused at infinity.

FIGS. 6A–6E are graphs showing various aberrations according to the second embodiment when the lens is focused at a near-distant object.

DESCRIPTION OF THE PREFERRED EMBODIMENTS

Figure 1:
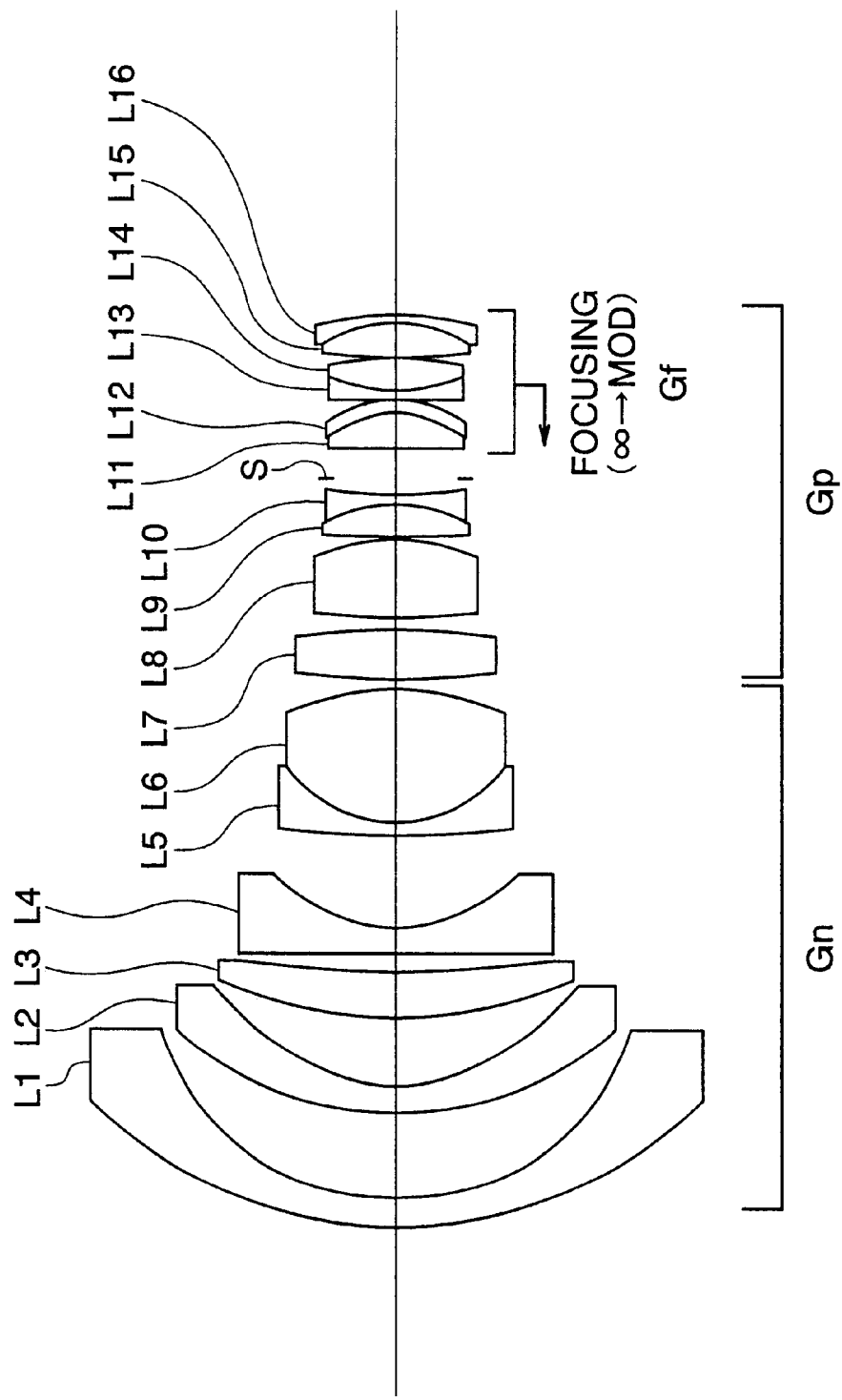
FIG. 1 is a drawing showing a lens configuration according to a first embodiment of the present invention.
Figure 2:
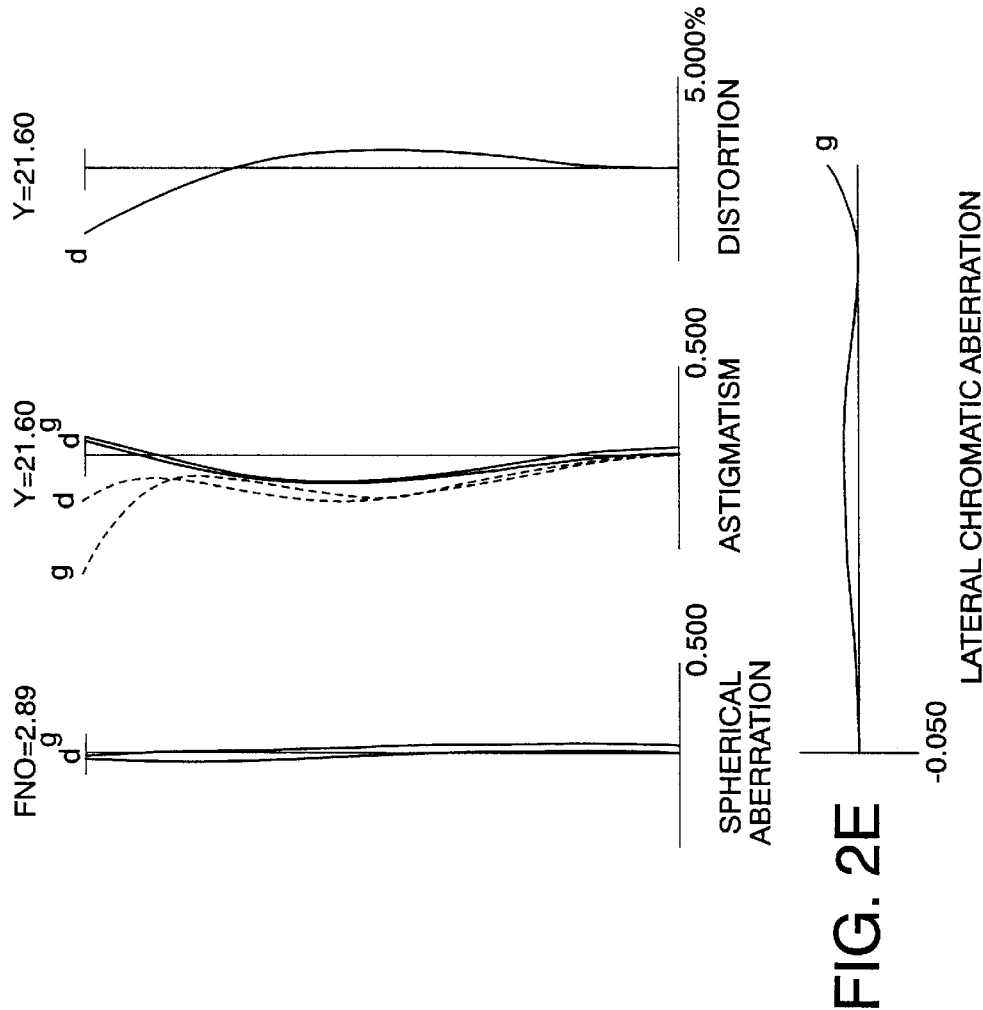
FIGS. 2A–2E are graphs showing various aberrations according to the first embodiment when the lens is focused at infinity.
Figure 3:
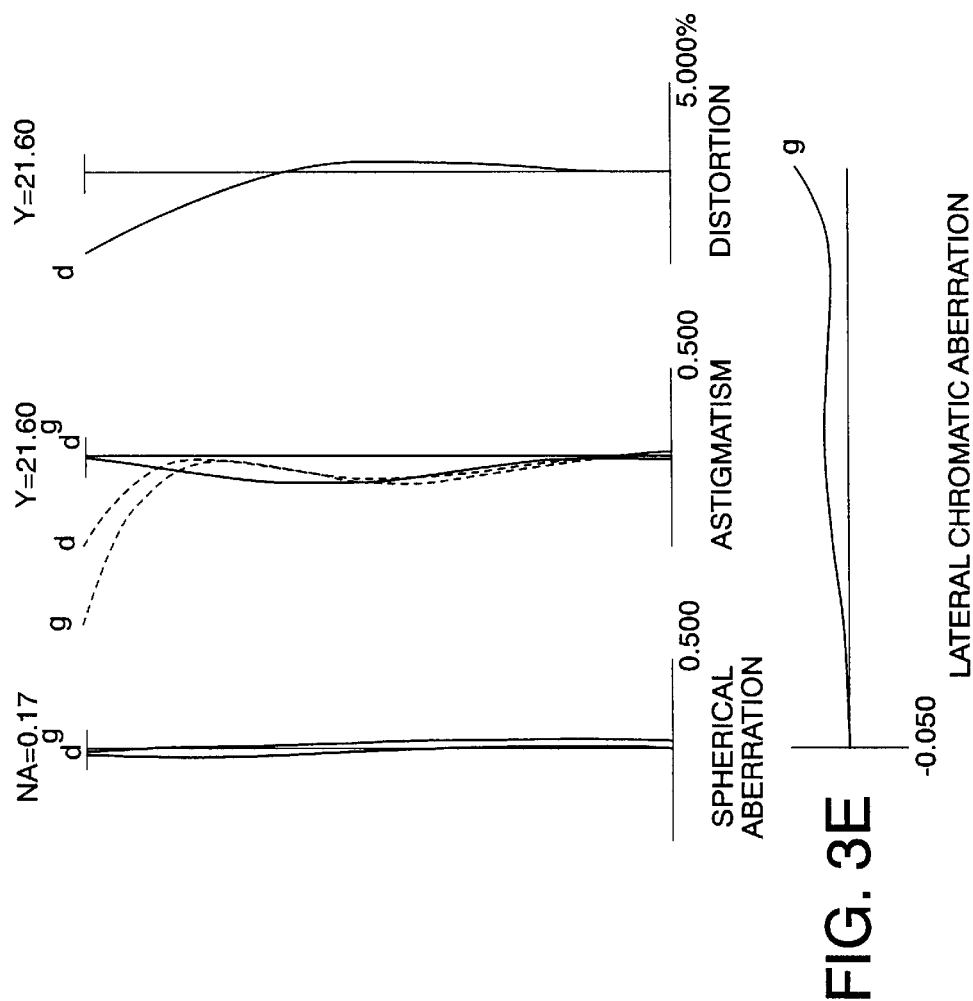
FIGS. 3A–3E are graphs showing various aberrations according to the first embodiment when the lens is focused at a near-distant object.

Embodiments according to the present invention are explained below. In designing an objective lens including a photographing lens, it is most difficult to satisfy both an extremely wide angle of view and a large relative-aperture. It is nothing else but to correct Seidel aberrations exhaustively. Since such optical design has great difficulty, a lens having the inclusive angle (angle of view) of 2 ω=118° or more with the conventional projection method, which is almost limit with the method, and also having a large relative-aperture of F 2.8 has not been proposed nor produced on a commercial basis.

As described above, the present invention provides an optical system having a unique specification that has never existed, having compactness to be able to use regularly, securing a sufficient peripheral quantity of light, and having an aspherical lens capable of being manufactured by current mass production technology.

In considering manufacturing method, instead of using a fine ground aspherical surface, which has not good productivity, to be able to use a glass molding method, which has high productivity, is directly connected to reducing costs, and is even advantageous to the user.

The fundamental configuration of the present invention is explained first. The fundamental configuration of the present invention is so-called "retro focusing type" lens that is composed of a divergent (negative) lens group and a convergent (positive) lens group. The divergent (negative) lens group is composed of a plurality of negative lenses and positive lenses starting from a negative meniscus lens. In order to correct both on axis and off axis aberrations well, a thick cemented lens is preferably included. In addition, as described later in the explanation of conditional expressions, aberrations with particular emphasis on off-axis aberrations are well corrected by a distinctive aspherical lens.

Moreover, the converging (positive) lens group, having a characteristic of a master lens, has lens groups having fundamentally a positive-negative-positive power arrangement. Furthermore, focusing at a near-distant object is carried out by moving the whole converging (positive) lens group or a portion of it. It is preferable that the lens group moving for focusing has at least a positive lens group, a negative lens group, and a positive lens group. In addition, it is preferable that the converging lens group has a plurality of cemented lenses in order to set an appropriate value of Petzvar sum and to well correct spherical aberration and lateral chromatic aberration.

In the present invention, the reason why an optical design of a large relative-aperture super wide-angle lens has been obtained is that an aspherical lens capable of easily manufacturing and having suitable correction effect has been developed. In designing an aspherical surface, the following distinctive technique can be mentioned: when an aspherical shape is expressed by the aforementioned aspherical expression, odd number order term (third order term in particular) and high order terms (twelfth order term, fourteenth order term, sixteenth order term) of the aspherical coefficient, and conical coefficient are elaborately chosen to correct aberrations meticulously.

Here, correction of aberration in connection with aspherical surface, in particular, odd number order term is briefly explained. Generally, since an optical system is rotationally symmetrical with respect to the optical axis, an aspherical surface is expressed by addition of even number order terms of a series. However, in the present invention, correction of aberration can be effectively carried out by introducing odd number order term into the series. In considering an aspherical surface in meridional image plane, sag amount X differs in sign of image height Y while existing odd number order term, so that symmetric property seems not to be held. However, in Cartesian coordinate system (X, Y, Z) having the optical axis in the X coordinate axis, considering $\rho=(Y^2+Z^2)^{1/2}$, signs coincide with each other, so that symmetric property is held. Third order aberration is produced in spherical system as well as aspherical system having even number order term of aspherical coefficient because the refractive surface is even number order term of ρ as shown below. Accordingly, if the refractive surface includes odd number order term, even number order aberration such as second order aberration, fourth order aberration, and the like, which have not existed, is produced. Furthermore, when the surface is a single surface and also an aspherical surface, spherical aberration exactly corresponds with the aspherical coefficients. Accordingly, superb aberration-correction effect never obtained by a spherical system can be obtained by introducing an aspherical coefficient of odd number order term.

Generally, a surface shape can be expressed by the following expression:

$$X = C2 \cdot \rho^2 + C4 \cdot \rho^4 + C6 \cdot \rho^6 + \ldots \quad (B)$$

The expression can be rewritten as the expression below when a paraxial radius of curvature is denoted by $r_0$.

$$X = \rho^2 \cdot 1/(2r_0) + C4 \cdot \rho^4 + C6 \cdot \rho^6 + \ldots \quad (C)$$

In addition, when a third order term C3 and a fifth order term C5 are added to this expression, the expression becomes as follows:

$$X = \rho^2 \cdot 1/(2r_0) + C3 \cdot \rho^3 + C4 \cdot \rho^4 + \ldots \quad (D)$$

For example, a second order spherical aberration a can be derived by following expression:

$$\Delta Yk' = 3 \cdot (nk' \cdot uk')^{-1} \cdot \left[ \sum_{i=1}^{k} (ni' - ni) \cdot C3i \cdot hi^3 \right] \cdot R^2 \quad (E)$$

where n denotes refractive index, u denotes an angle of a light ray relative to the optical axis, a value with a dash "'" denotes a value in the exit side, a value without a dash "'" denotes a value in the entrance side, i denotes a surface number, C3i denotes a third order aspherical coefficient of each surface, h denotes a height of incident ray to each surface, and R denotes a radius of entrance pupil. Accordingly, the third order spherical aberration is proportional to the fourth power of the height of incident ray h, and to the third power of the radius of entrance pupil R. The second order spherical aberration is proportional to the third power of the height of incident ray h, and to the square of the radius of entrance pupil R. Therefore, a lower order aberration never corrected well up to now has been corrected by introducing the third order term of the aspherical coefficient. As a result, it becomes possible to further increase the specifications and the optical performance. The same thing can be applied to the other aberrations such as distortion, coma, and the like. In particular, in a large relative-aperture super wide-angle lens as the present invention, when an aspherical surface is introduced in relatively to the object side of the divergent lens group, it shows high correction ability of lower order portion of distortion.

Moreover, although distortion shape has been a barrel shape in lower image portion and a pincushion shape in higher image portion, this aberration can be greatly improved by introducing third order term. In coma and spherical aberration, since lower order aberration can be corrected well, a circle of least confusion can be made smaller by correcting negative aberration produced by rather lower incident height caused by, for example, enlarging the relative-aperture. In the present invention, in order to take advantage of a large relative-aperture, since the greater effect can be expected by introducing an aspherical surface on the surface having a large angle of deviation a relative to the marginal ray (the ray having the largest numerical aperture emanated from an on-axis infinite object), it is desirable that an aspherical surface described above is introduced on a concave surface facing to the image.

Moreover, it is effective to suitably use high order terms and the conical coefficient κ. First, the conical coefficient κ is explained.

The first term of the aspherical expression is expanded in a power series, and only aspherical terms regarding K are shown in the following expression:

$$x(y) = \quad (F)$$
$$\frac{1}{2}(c_0 + 2c_2)y^2 - \frac{1}{8}(c_0^3 \kappa + 8c_4)y^4 + \frac{1}{16}(c_0^5 \kappa^2 + 16 c_6)y^6 + \ldots$$

$$\because c_0 = \frac{1}{r}$$

where $c_0 + 2c_2 = 1/r_0$, $r_0$ denotes a paraxial radius of curvature, and r denotes a reference radius of curvature.

Accordingly, it is understood that the conical coefficient κ affects the fourth order or higher term of the aspherical coefficients. By positively using κ for correcting aberrations, independent κ terms permit to obtain almost same aberration correction effect obtained by using from lower order term to very high order term of aspherical coefficients. In particular, when the curvature (power) in the lower order portion (relatively near portion to the optical axis) is made stronger and the curvature (power) in the higher order portion (the portion away from the optical axis and in the vicinity of the maximum effective aperture) is made extremely weaker, it is desirable that the value of κ takes from −1 to +1, that means the aspherical surface has a shape based on from an ellipsoid to a hyperboloid. By suitably arranging the conical coefficient κ, aberrations such as distortion, lower coma, and astigmatism can be corrected well.

Moreover, high order terms of twelfth or more have quite important effect when an optical system having an extremely wide angle of view as the present invention is to be realized. In the present invention, an aspherical surface is introduced to a surface located near the object side where off-axis aberrations can be corrected effectively.

Accordingly, since each height $\overline{h}$ that the principal ray of off-axis rays correspondent with each image height passes through each lens surface is sufficiently separated with each other and also the width of rays correspondent with each image height is small, correction of aberrations can be carried out relatively separately with each rays correspondent with each image height by strongly controlling only high order terms.

Therefore, aberration correspondent with marginal ray, which has not been able to be corrected well, can be corrected well by effectively using high order terms of the aspherical coefficients. In particular, a suitable arrangement of high order terms is quite effective for improving optical performance in the peripheral portion, so that aberrations in extremely peripheral portion such as distortion, lower coma, and astigmatism can be kept in good condition.

As described above, the present invention makes it possible to correct aberrations by optimally arranging an aspherical surface taking h, $\overline{h}$ into consideration and by suitably controlling parameters such as ordinary even number order term as well as odd number order term, κ, and higher order terms of the aspherical coefficients.

Generally, a design solution, even if possible in design, often has difficulty in actual manufacturing. In the present invention, an aspherical lens is controlled in easy manufacturing shape by suitably arranging its position and by controlling the conical coefficient κ and higher order terms. Accordingly, an aspherical lens having a concave aspherical surface, which has been difficult to be fabricated by a fine ground method or a glass molding method, is made to take a shape capable of being fabricated by a glass molding method. Moreover, optical performance is also improved and compactness can be accomplished by reducing the number of lens element as well as the number of positive lens element in the divergent lens group.

Conditional expressions according to the present invention are explained below. Conditional expression (1) defines an appropriate shape of a negative aspherical lens in the divergent lens group having negative refractive power. As described above, conditional expression (1) makes it possible to exist optical performance together with productivity by freely using various parameters of aspherical coefficients. Conditional expression (1) shows variation in pseudo inclination of the aspherical surface in central portion and in peripheral portion and variation in thickness of the lens element by the ratio of the thickness of the aspherical lens at the maximum height where the off-axis rays passes relative to the thickness at height of 30% of the effective aperture (where the maximum value is to be 100%).

In the aspherical surface, it is important that higher order terms and the conical coefficient κ are dominantly controlled in the portion where the maximum off-axis ray passes, and Kκ, third order term, and fourth order term are controlled in the portion of 30% height of the effective aperture. As described above, in correction of aberration, spherical aberration, lower coma of lower angle of view, and distortion can be corrected well in the vicinity of 30% height of the effective aperture, and distortion in the periphery of the image, lower coma, and astigmatism can be corrected well in the vicinity of the maximum effective aperture.

Talking about the current problems of lens fabrication using a glass molding method, when thickness difference in a meniscus lens has more than several ten times, it becomes extremely difficult to produce in volume. In addition, when the tangent angle to the concave surface side becomes 40° or more, a surface shape with high precision cannot be molded any more. And when the tangent angle increases and the surface is approaching to a hemisphere, the glass molding method itself becomes impossible.

When conditional expression (1) exceeds the upper limit, the aspherical lens becomes excessively thick in the periphery, so that it becomes difficult to fabricate. In correction of aberration, the correction balance of the aspherical surface becomes worse locally, so that correction of distortion, astigmatism, and spherical aberration becomes worse. When the upper limit of conditional expression (1) is set to 2.8, it is desirable that the difficulty in fabrication is eased. In addition, when the upper limit of conditional expression (1) is set to 2.6, it is more preferable that even better optical performance of the present invention can be expected.

On the other hand, when conditional expression (1) falls below the lower limit, the curvature in the periphery of the aspherical lens becomes excessively weak. Accordingly, the variation in aberration in the peripheral portion becomes extremely large, so that it causes that optical performance becomes worse. In the end, the marginal rays cannot focus any more. When the lower limit of conditional expression (1) is set to 0.3, it is desirable that better correction As can be obtained. In addition, when the lower limit of conditional expression (1) is set to 0.8 or more, it is more preferable that even better optical performance of the present invention can be expected.

When the aspherical lens is a cemented lens, since each lens element is fabricated separately, conditional expression is to be calculated in accordance with the composite thickness of glass and resin ($d_0$, $d_{\varphi max}$, $d_{30}$, and the like)

When a plurality of aspherical lenses are there in the divergent negative lens group, it is sufficient that at least one aspherical lens satisfies conditional expression (1). It is desirable for the correction of aberration and compactness that the aspherical lens satisfying conditional expression (1) is located to the most object side among the plurality of aspherical lenses. It is further preferable for fabricating the aspherical lens as well as the correction of aberration and compactness that the aspherical lens is located second or behind counted from object side, so that even better optical performance of the present invention can be expected.

In order to obtain even better optical performance, of the present invention, it is desirable that in addition to the aspherical lens another aspherical surface is arranged for correcting off-axis aberrations, in particular, lower coma and spherical aberration. Furthermore, it is desirable in consideration of productivity that the aspherical lens is fabricated by the glass molding method or the compound method composed of glass and resin.

Conditional expression (2) defines a condition regarding the paraxial power of the aspherical lens. In the aspherical surface expressed by the aforementioned aspherical expression, the paraxial amount such as the focal length includes not only the paraxial radius of curvature but also second order aspherical term as shown in the first term of the mathematical expression (F). When conditional expression (2) exceeds the upper limit, the negative paraxial power of the aspherical lens becomes excessively large, so that local variation in the aspherical surface curve becomes excessively large in order to keep the shape defined by the range of conditional expression (1), and, as a result, it is undesirable that each aberration mentioned above becomes worse.

When the upper limit of conditional expression (2) is set to −1.85, it is desirable that better correction of aberrations can be obtained. In addition, when the upper limit of conditional expression (2) is set to −2, it is more preferable that even better optical performance of the present invention can be expected.

On the other hand, when conditional expression (2) falls below the lower limit in a large relative-aperture super wide-angle lens as the present invention, since variation in the aspherical surface becomes extremely small even if the aspherical surface is within the range of conditional expression (1), correction effect of the aspherical surface becomes weak, so that good correction of aberration cannot be obtained. In a large relative-aperture super wide-angle lens as the present invention, in order to keep sufficient back focal distance, it is necessary for each negative lens element to have strong negative power.

When the lower limit of conditional expression (2) is set to −10, it is desirable that better correction of aberrations can be obtained. In addition, when the lower limit of conditional expression (2) is set to −8 or more, it is more preferable that even better optical performance of the present invention can be expected.

Conditional expression (3) defines an appropriate range of the third order aspherical coefficient of the aspherical surface locating on a concave surface, and locating the most object side aspherical surface among the aspherical surfaces arranged in the divergent lens group. When the aspherical surface used in the present invention is expressed by the aforementioned aspherical expression, it is necessary for the third order term of the aspherical surface to suitably set in order to well correct distortion, come and spherical aberration.

When conditional expression (3) exceeds the upper limit, it means that the third order term of the aspherical coefficient becomes extremely large, so that spherical aberration and distortion in the relatively lower incident height portion varies largely in positive direction by, in particular, the second order spherical aberration. As a result, the inclination of the spherical aberration (differential value) becomes large, so that it is undesirable that so-called "undulation" becomes obvious and optical performance becomes worse. In addition, various aberrations such as coma and distortion are overcorrected as described above, so that aberrations become worse.

When the upper limit of conditional expression (3) is set to $5\times10^{-3}$ or less, it is desirable that better correction of aberrations can be obtained. In addition, when the upper limit of conditional expression (3) is set to $1\times10^{-3}$ or less, it is more preferable that even better optical performance of the present invention can be expected.

On the other hand, when conditional expression (3) falls below the lower limit, the aberration correction effect becomes weak, so that optical performance of the present invention cannot be obtained. When the lower limit of conditional expression (3) is set to $5\times10^{-6}$ or more, it is desirable that better correction of aberrations can be obtained. In addition, when the lower limit of conditional expression (3) is set to $1\times10^{-5}$ or more, it is more preferable that even better optical performance of the present invention can be expected.

Although an optical system according to the present invention has an extremely strong retrofocus ratio, it employs a focusing method with very small variation in aberration while focusing at near object. The focusing lens group or a portion of the focusing lens group has at least one fundamental lens construction of a Triplet type having positive-negative-positive power arrangement and a Gauss type. This is because the focusing lens group sufficiently carries out aberration correction within the lens group to suppress variation in aberration as small as possible while focusing at near object and also because the focusing lens group is given a lens construction as a master lens. Here, the power of the focusing lens group becomes a very important factor.

When conditional expression (4) exceeds the upper limit, since the power of the focusing lens group becomes small, the moving amount of the focusing lens group increases, so that it becomes difficult to make shorter the closest focusing distance. When the upper limit of conditional expression (4) is set to 8, it is desirable that the closest focusing distance can be made closer. In addition, when the upper limit of conditional expression (4) is set to 5, it is more preferable that even better optical performance of the present invention can be expected.

On the other hand, when conditional expression (4) falls below the lower limit, the power of the focusing lens group becomes extremely large, it is undesirable that variation in aberration while focusing at near object increases. It is undesirable that variation in curvature of field and astigmatism, in particular, becomes excessive. When the lower limit of conditional expression (4) is set to 3.1, it is desirable that better correction of aberrations can be obtained. In addition, when the lower limit of conditional expression (4) is set to 3.2, it is more preferable that even better optical performance of the present invention can be expected.

Moreover, a plurality of focusing lens groups may exist and the so-called "floating effect" may be used. In this case, since a lens group having stronger power has stronger effect for focusing, conditional expression (4) is to be calculated by using $f_x$ of the lens group having the shortest focal length.

Furthermore, in the present invention, it is desirable that the following conditional expression (5) is satisfied:

$$1.9 < BF_\infty / f_0 < 4 \qquad (5)$$

where $BF_\infty$ denotes the back focal length when focusing at infinity, and $f_0$ denotes the focal length of the whole lens system.

Conditional expression (5) described above defines an appropriate range of the so-called "retrofocus ratio". By selecting optimum retrofocus ratio satisfying conditional expression (5), problems such as the total lens length, good correction of off-axis aberrations, mechanical interference with a mirror or the like can be solved.

When conditional expression (5) exceeds the upper limit, since the retrofocus ratio becomes excessively large, not only the whole optical system such as a super wide-angle lens according to the present invention becomes extremely large but also it is undesirable that correction of aberration such as off-axis aberrations and sagittal coma flare becomes worse.

On the other hand, when conditional expression (5) falls below the lower limit, since the retrofocus ratio becomes too small, a super wide-angle lens according to the present invention produces mechanical interference with a mirror or the like, so that it may causes inconveniance that the lens cannot be applied to a lens for a single lens reflex.

Numerical examples of a super wide-angle lens according to the present invention is explained below with reference to accompanying drawings.

First Embodiment

FIG. 1 is a drawing showing a lens configuration of a super wide-angle lens according to a first embodiment of the present invention. The lens is composed of two lens groups, in order from an object, a divergent lens group Gn having negative refractive power and a convergent lens group Gp having positive refractive power. The divergent lens group Gn is composed of, in order from the object, a negative meniscus lens L1 having a convex surface facing to the object side, an aspherical negative meniscus lens L2 having a convex surface facing to the object side and having an aspherical surface facing to an image side, a positive meniscus lens L3 having a convex surface facing to the object side, a compound type aspherical double concave lens L4 having a compound type aspherical surface composed of glass and resin facing to the image side wherein the aspherical surface is formed on resin, a cemented positive lens composed of a negative meniscus lens L5 having a convex surface facing to the object side and a thick double convex lens L6.

The convergent lens group Gp is composed of, in order from the object, two thick double convex lenses L7 and L8, a cemented negative lens composed of a double convex lens L9 and a double concave lens L10, an aperture stop S, and a focusing lens group Gf. The focusing lens group Gf is composed of a cemented positive lens composed of a positive meniscus lens L11 having a concave surface facing to the object side and a negative meniscus lens L12 having a concave surface facing to the object side, a cemented negative lens composed of a double concave lens L13 and a double convex lens L14, and a cemented positive lens composed of a double convex lens L15 and a negative meniscus lens L16 having a concave surface facing to the object side.

In FIG. 1, MOD denotes a minimum object distance.

Focusing at near distant object is carried out by moving only the focusing lens group Gf to the object side and is possible up to the shooting distance of 0.2 m (shooting magnification of −0.173). Since focusing is carried out by the lens group locating after the aperture stop S, it is suitable for a focusing method so-called "in-lens motor" method. Moreover, since the focusing lens group Gf works as a single optical system, it can be used as a so-called "anti-vibration lens". Furthermore, it can be used as a so-called "shift lens" by shifting only the focusing lens group off-axis.

Various values associated with this embodiment are listed in Table 1. In Table 1, the number in the left most column denotes a lens surface number counted from the object side, ri denotes the radius of curvature of the i-th lens surface Ri, di denotes the distance along the optical axis between the lens surfaces Ri and Ri+1, νi denotes Abbe number of the medium between the lens surfaces Ri and Ri+1, and ni denotes the refractive index for the d-line ($\lambda$=587.56 nm) of the medium between the lens surfaces Ri and Ri+1. A star mark "★" is added to an aspherical surface, the paraxial radius of curvature is listed on the column for radius of curvature, and κ and respective aspherical coefficients are listed in the aspherical data section.

In the various values, $f_0$ denotes the focal length, $\beta$ denotes the photographing magnification, FNO denotes the f-number, and 2 ω denotes the angle of view (inclusive angle). By the way, the unit of length such as the radius of curvature is mm.

TABLE 1

(Specifications)
$f_0$ = 13.38 mm
$2_\omega$ = 118.3°
FNO = 2.89

(Lens Data)

| | r | d | ν | n | |
|---|---|---|---|---|---|
| 1) | 49.1686 | 3.2000 | 49.61 | 1.772500 | |
| 2) | 29.0414 | 10.4500 | | 1.000000 | |
| 3) | 36.9310 | 3.1500 | 49.52 | 1.744429 | |
| ★4) | 16.5607 | 8.2000 | | 1.000000 | $h_{max}$ = 20.79* |
| 5) | 49.1426 | 5.4500 | 64.10 | 1.516800 | |
| 6) | 109.6301 | 2.2000 | | 1.000000 | |
| 7) | −1351.7476 | 2.4500 | 45.30 | 1.794997 | |
| 8) | 18.0000 | 0.1000 | 38.70 | 1.552230 | |
| ★9) | 18.5889 | 11.5500 | | 1.000000 | |
| 10) | 84.9665 | 1.8000 | 42.72 | 1.834810 | |
| 11) | 15.6386 | 15.8500 | 33.80 | 1.647690 | |
| 12) | −36.5124 | 1.2000 | | 1.000000 | |
| 13) | 77.0703 | 6.0000 | 48.87 | 1.531720 | |
| 14) | −180.4056 | 1.5500 | | 1.000000 | |
| 15) | 59.6966 | 9.3000 | 48.87 | 1.531720 | |
| 16) | −26.7247 | 0.4500 | | 1.000000 | |
| 17) | 126.8401 | 3.8500 | 52.42 | 1.517420 | |
| 18) | −17.4698 | 1.3000 | 37.35 | 1.834000 | |
| 19) | 48.0387 | 2.0000 | | 1.000000 | |
| 20> | | d20 | | 1.000000 | aperture stop |
| 21) | −772.3579 | 4.0000 | 70.24 | 1.487490 | |
| 22) | −13.7605 | 1.3000 | 49.61 | 1.772500 | |
| 23) | −17.5351 | 0.1000 | | 1.000000 | |
| 24) | −341.9896 | 1.3000 | 45.30 | 1.794997 | |
| 25) | 19.3148 | 3.7000 | 82.52 | 1.497820 | |
| 26) | −62.8479 | 0.3000 | | 1.000000 | |
| 27) | 69.1177 | 4.0000 | 82.52 | 1.497820 | |
| 28) | −17.6971 | 1.0000 | 46.58 | 1.804000 | |
| 29) | −42.0166 | BF | | 1.000000 | |

(*$h_{max}$ denotes the maximum effective radius)

Aspherical Data (κ and respective aspherical coefficients)
surface number 4
κ: 0.0612
C2: 0.00000
C3: −0.97966×10⁻⁴
C4: −2.78510×10⁻⁶
C6: 2.22620×10⁻⁸
C8: −2.63446×10⁻¹⁰
C10: 6.84880×10⁻¹³
C12: 0.66684×10⁻¹⁶
C14: −0.28207×10⁻¹⁷
C16: 0.33266×10⁻²⁰
surface number 9
κ: 0.8560
C2: 0.00000
C3: 0.77972×10⁻⁴
C4: 3.29240×10⁻⁵
C6: −8.5818×10⁻⁹
C8: −1.79840×10⁻¹¹
C10: −5.78320×10⁻¹⁴
C12: −0.40429×10⁻¹³
C14: 0.18565×10⁻¹⁵
C16: −0.24524×10⁻¹⁸

(Variable Intervals While Focusing)

| | 1-POS | 2-POS | 3-POS | 4-POS |
|---|---|---|---|---|
| $f_0$ or β | 13.38000 | −0.02500 | −0.10000 | −0.17292 |
| D0 | ∞ | 509.9354 | 108.7109 | 52.3863 |
| d20: | 3.77748 | 3.44122 | 2.43480 | 1.45963 |
| BF: | 38.08638 | 38.42264 | 39.42906 | 40.40423 |

(Values for the Conditional Expressions)

$$\frac{(d_{\phi max} - d_0)/h_{max}}{(d_{30} - d_0)/h_{30}} = 2.443 \qquad (1)$$

$$f_{asp}/f_0 = -3.22\,7 \qquad (2)$$

$$|C3| = 0.97966 \times 10^{-4} \qquad (3)$$

$$f_x/f_0 = 3.362 \qquad (4)$$

$$BF_\infty/f_0 = 2.846 \qquad (5)$$

FIGS. 2A–2E are graphs showing various aberrations according to the present embodiment when the lens is focused at infinity. As is apparent from the respective graphs, excellent correction is made for various aberrations. FIGS. 3A–3E are graphs showing various aberrations according to the present embodiment when the photographing magnification is −1/40. As is apparent from the respective graphs, the variation in aberration while focusing at a near-distant object is well corrected. In graphs showing various aberrations, FNO denotes the f-number, Y denotes an image height, d and g denote aberration curves for d-line and g-line, respectively. In the graphs showing astigmatism, a solid line indicates a sagittal image plane and a broken line indicates a meridional image plane. In the following embodiments, the same symbols as this embodiment are employed.

Second Embodiment

Figure 4:
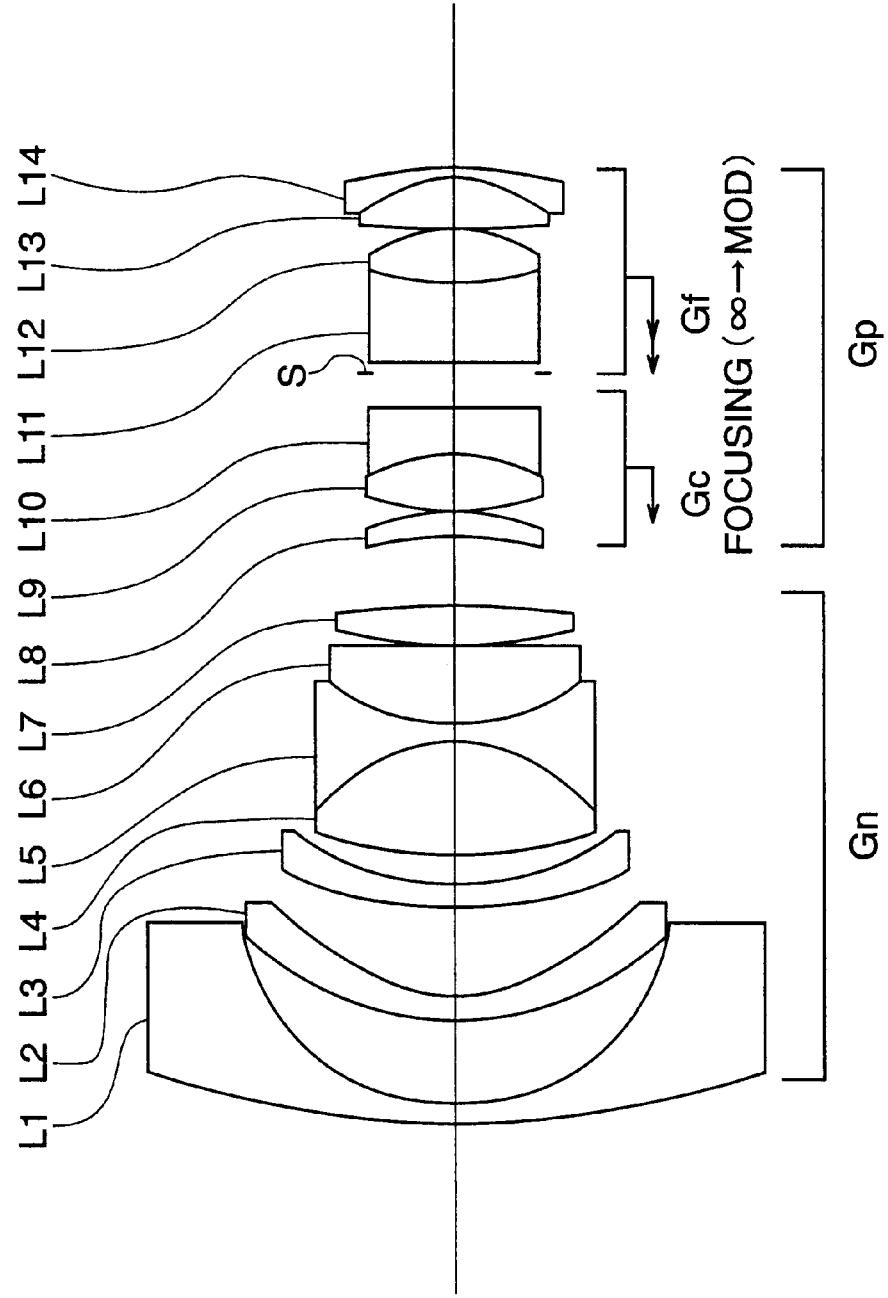
FIG. 4 is a drawing showing a lens configuration according to a second embodiment.

FIG. 4 is a drawing showing a lens configuration of a super wide-angle lens according to a second embodiment. The lens is composed of two lens groups, a negative and a positive lens groups, in order from an object, a divergent lens group Gn having negative refractive power and a convergent lens group Gp having positive refractive power. The divergent lens group Gn is composed of, in order from the object, a negative meniscus lens L1 having a convex surface facing to the object side, an aspherical negative meniscus lens L2 having a convex surface facing to the object side and having aspherical surfaces on both object and image sides, a negative meniscus lens L3 having a convex surface facing to the object side, a triple cemented positive lens composed of a thick double convex lens L4, a double concave lens L5, and a thick double convex lens L6, and a double convex lens L7. The converging lens group Gp is composed of, in order from the object, a positive meniscus lens L8 having a concave surface facing to the object side, a cemented positive lens composed of a double convex lens L9 and a thick double concave lens L10, an aperture stop S, a cemented positive lens composed of a thick negative meniscus lens L11 having a convex surface facing to the object side and a double convex lens L12, and a cemented positive lens composed of a double convex lens L13 and a negative meniscus lens L14 having a concave surface facing to the object side.

Focusing is carried out by moving the converging lens group Gp. With the aperture stop S as a boundary, the object side lens group Gc (L8–L10) forms a compensating lens group, and the image side lens group Gf (L11–L14) including the aperture stop S forms a focusing lens group. On focusing at near distant object, only the focusing lens group Gf and the compensating lens group Gc are moved to the object side wherein the moving amount of the focusing lens group Gf is larger than that of the compensating lens group Gc, and the movement of the focusing lens group Gf relative to the compensating lens group Gc is not linear with respect to the photographing distance. The focusing can be possible up to the photographing distance of 0.18 m (photographing magnification is –0.232). Moreover, since the focusing lens group Gf and the compensating lens group Gc work as a single optical system, they can be used as a so-called "anti-vibration lens". Furthermore, they can be used as a so-called "shift lens" by shifting off-axis the focusing lens group Gf and the compensating lens group Gc as a single lens group.

Various values according to the second embodiment are listed in Table 2. In Table, symbols and aspherical expressions are the same as in the first embodiment described above.

TABLE 2

(Specifications)
$f_0$ = 13.40 mm
$2_\omega$ = 118.9°
FNO = 2.89
(Lens Data)

| | r | d | v | n | |
|---|---|---|---|---|---|
| 1) | 80.5145 | 2.0000 | 49.45 | 1.772789 | |
| 2) | 21.2709 | 8.6441 | | 1.000000 | |
| ★3) | 26.8136 | 2.4000 | 45.37 | 1.796681 | |
| ★4) | 12.4522 | 9.2092 | | 1.000000 | $h_{max}$ = 17.78* |
| 5) | 36.2138 | 2.5000 | 49.45 | 1.772789 | |
| 6) | 25.4097 | 3.0282 | | 1.000000 | |
| 7) | 38.3479 | 12.0010 | 40.76 | 1.581440 | |
| 8) | –16.9894 | 1.8500 | 49.61 | 1.772500 | |
| 9) | 18.3548 | 8.0000 | 32.17 | 1.672700 | |
| 10) | –1535.8467 | 0.1000 | | 1.000000 | |
| 11) | 38.7424 | 4.0000 | 38.02 | 1.603420 | |
| 12) | –148.7969 | d12 | | 1.000000 | |
| 13) | –42.3829 | 2.7000 | 70.41 | 1.487490 | |
| 14) | –24.5665 | 0.1000 | | 1.000000 | |

TABLE 2-continued (Specifications)
$f_0$ = 13.40 mm
$2_\omega$ = 118.9°
FNO = 2.89
(Lens Data)

| | r | d | v | n | |
|---|---|---|---|---|---|
| 15) | 21.7191 | 6.0000 | 82.52 | 1.497820 | |
| 16) | –18.0871 | 5.0000 | 43.35 | 1.840421 | |
| 17) | 214.6171 | d17 | | 1.000000 | |
| 18>  | | 1.0000 | | 1.000000 | aperture stop S |
| 19) | 468.2634 | 8.0000 | 52.30 | 1.748099 | |
| 20) | 23.6125 | 5.5000 | 70.41 | 1.487490 | |
| 21) | –16.2338 | 0.1000 | | 1.000000 | |
| 22) | 78.8775 | 5.4206 | 82.52 | 1.497820 | |
| 23) | –13.6227 | 1.0000 | 45.37 | 1.796681 | |
| 24) | –50.3950 | BF | | 1.000000 | |

(*$h_{max}$ denotes the maximum effective radius)

Aspherical Data ($\kappa$ and respective aspherical coefficients)
surface number 3
$\kappa$: 0.9785
C2: 0.00000
C3: –0.13556×10$^{-4}$
C4: 3.27740×10$^{-7}$
C6: –1.69520×10$^{-9}$
C8: –2.36410×10$^{-12}$
C10: –1.54710×10$^{-16}$
C12: –0.25927×10$^{-17}$
C14: 0.58654×10$^{-20}$
C16: 0.00000
surface number 4
$\kappa$: –0.2302
C2: 0.00000
C3: 0.10414×10$^{-4}$
C4: –1.01430×10$^{-5}$
C6: 1.13160×10$^{-7}$
C8: 8.58736×10$^{-10}$
C10: 2.38760×10$^{-12}$
C12: –0.41649×10$^{-14}$
C14: 0.31478×10$^{-17}$
C16: 0.00000
(Variable Intervals While Focusing)

| | 1-POS | 2-POS | 3-POS | 4-POS |
|---|---|---|---|---|
| $f_0$ or $\beta$ | 13.39818 | –0.03333 | –0.10000 | –0.23152 |
| D0 | ∞ | 387.5292 | 118.8044 | 42.7863 |
| d12: | 6.97454 | 6.72518 | 6.69378 | 6.43616 |
| d17: | 3.66079 | 3.41143 | 2.53774 | 0.96888 |
| BF: | 38.02528 | 38.52400 | 39.42909 | 41.25557 |

(Values for the Conditional Expressions)

$$\frac{(d_{\phi max} - d_0)/h_{max}}{(d_{30} - d_0)/h_{30}} = 1.669 \qquad (1)$$

$$f_{asp}/f_0 = -2.352 \qquad (2)$$

$$|C3| = 0.10414 \times 10^{-4} \qquad (3)$$

$$f_x/f_0 = 3.3357 \quad (4)$$

$$BF_\infty/f_0 = 2.838 \quad (5)$$

FIGS. 5A–5E are graphs showing various aberrations according to the second embodiment when the lens is focused at infinity. As is apparent from the respective graphs, excellent correction is made for various aberrations. FIGS. 6A–6E are graphs showing various aberrations according to the second embodiment when the photographing magnification is −1/30. As is apparent from the respective graphs, the variation in aberration while focusing at a near-distant object is well corrected.

As described above, the present invention makes it possible to provide a large relative-aperture super wide-angle lens having the inclusive angle of 2 ω=118° or more with the conventional projection method (y=f·tan θ) having the relative-aperture of about F 2.8, having compactness and high optical performance, and having small variation of aberration in relatively closed object distance, and to provide a photographing apparatus equipped with the lens.

What is claimed is:

1. A super wide-angle lens comprising, in order from an object;
    a divergent lens group having negative refractive power; and
    a convergent lens group having positive refractive power;
    the divergent lens group having at least one aspherical negative lens;
    wherein the aspherical negative lens satisfies the following conditional expressions;

$$0 < \frac{(d_{\phi max} - d_0)/h_{max}}{(d_{30} - d_0)/h_{30}} < 3 \quad (1)$$

$$-15 < f_{asp}/f_0 < -1.7 \quad (2)$$

where $d_0$ denotes the thickness of the aspherical lens along the optical axis (center thickness), $d_{\phi max}$ denotes the thickness of the aspherical lens parallel to the optical axis at the height of the maximum effective aperture on the image side surface, $d_{30}$ denotes the thickness of the aspherical lens parallel to the optical axis at the height of 30% of the maximum effective aperture when the maximum effective aperture on the image side surface is assumed to be 100%, $h_{max}$ denotes the maximum effective radius of the aspherical lens on the image side surface, $h_{30}$ denotes the 30% of the maximum effective radius of the aspherical lens when the maximum effective aperture on the image side surface is assumed to be 100%, $f_{asp}$ denotes the paraxial focal length of the aspherical lens, and $f_0$ denotes the focal length of the whole system of the super wide-angle lens.

2. The super wide-angle lens according to claim 1;
    wherein the divergent lens group includes at least two aspherical surfaces;
    wherein an aspherical surface located to the most object side among the two aspherical surfaces and also located on a concave surface has a third order term when the aspherical surface is expressed by the following aspherical expression (A):

$$X(y) = (y^2/r)/[1+(1-\kappa \cdot y^2/r^2)^{1/2}] + C2 \cdot y^2 + C3 \cdot |y|^3 + C4 \cdot y^4 + C6 \cdot y^6 + C8 \cdot y^8 + C10 \cdot y^{10} + C12 \cdot y^{12} + C14 \cdot y^{14} + C16 \cdot y^{16} \quad (A)$$

where X(y) denotes the distance (sag amount) between the tangent plane to the vertex of the aspherical surface and the aspherical surface along the optical axis at the height y vertical from the optical axis, r denotes the reference radius of curvature, κ denotes a conical coefficient, and Cn denotes the aspherical coefficient of n-th order; and
    wherein the aspherical surface satisfies the following conditional expression (3);

$$1 \times 10^{-6} < |C3| < 1 \times 10^{-2} \quad (3)$$

where C3 denotes the third order term of the aspherical surface when the aspherical surface is expressed by the aspherical expression (A).

3. The super wide-angle lens according to claim 2;
    wherein the convergent lens group having positive refractive power has at least one focusing lens group that moves while focusing at a near-distant object, and the following conditional expression is satisfied;

$$3 < f_x/f_0 < 12 \quad (4)$$

where $f_x$ denotes the focal length of the focusing lens group, wherein when a plurality of focusing lens groups are there in the convergent lens group, $f_x$ denotes that of the focusing lens group having the shortest focal length, and $f_0$ denotes the focal length of the whole system of the super wide-angle lens.

4. A photographing apparatus equipped with the super wide-angle lens according to claim 3.

5. A photographing apparatus equipped with the super wide-angle lens according to claim 2.

6. The super wide-angle lens according to claim 1;
    wherein the convergent lens group has at least one focusing lens group that moves while focusing at a near-distant object, and the following conditional expression is satisfied;

$$3 < f_x/f_0 < 12 \quad (4)$$

where $f_x$ denotes the focal length of the focusing lens group, wherein when a plurality of focusing lens groups are there in the convergent lens group, $f_x$ denotes that of the focusing lens group having the shortest focal length, and $f_0$ denotes the focal length of the whole system of the super wide-angle lens.

7. A photographing apparatus equipped with the super wide-angle lens according to claim 6.

8. A photographing apparatus equipped with the super wide-angle lens according to claim 1.

9. The super wide-angle lens according to claim 1, wherein the following conditional expression is satisfied;

$$1.9 < BF_\infty/f_0 < 4 \quad (5)$$

where $BF_\infty$ denotes the back focal length when focusing at infinity, and $f_0$ denotes the focal length of the whole lens system of the super wide-angle lens.

10. A super wide-angle lens with the angle of field 2 ω=110° or more comprising, in order from an object;
    a divergent lens group having negative refractive power; and
    a convergent lens group having positive refractive power;
    the divergent lens group including, in order from the object;
    a negative meniscus lens having a convex surface facing to the object side; and an aspherical negative lens having at least one aspherical surface facing to an image side;

wherein the aspherical surface has a shape that the radius of curvature becomes gentle from the center of the optical axis to the periphery; and wherein the aspherical negative lens satisfies the following conditional expression;

$$0 < \frac{(d_{\phi max} - d_0)/h_{max}}{(d_{30} - d_0)/h_{30}} < 3 \qquad (1)$$

where $d_0$ denotes the thickness of the aspherical lens along the optical axis (center thickness), $d_{\phi max}$ denotes the thickness of the aspherical lens parallel to the optical axis at the height of the maximum effective aperture on the image side surface, $d_{30}$ denotes the thickness of the aspherical lens parallel to the optical axis at the height of 30% of the maximum effective aperture when the maximum effective aperture on the image side surface is assumed to be 100%, $h_{max}$ denotes the maximum effective radius of the aspherical lens on the image side surface, and $h_{30}$ denotes the 30% of the maximum effective radius of the aspherical lens when the maximum effective aperture on the image side surface is assumed to be 100%.

11. The super wide-angle lens according to claim 10, wherein the convergent lens group has at least one focusing lens group that moves while focusing at a near-distant object, and the following conditional expression is satisfied;

$$3 < f_x/f_0 < 12 \qquad (4)$$

where $f_x$ denotes the focal length of the focusing lens group, wherein when a plurality of focusing lens groups are there in the convergent lens group, $f_x$ denotes that of the focusing lens group having the shortest focal length, and $f_0$ denotes the focal length of the whole system of the super wide-angle lens.

12. A photographing apparatus equipped with the super wide-angle lens according to claim 11.

13. A photographing apparatus equipped with the super wide-angle lens according to claim 10.

14. The super wide-angle lens according to claim 10, wherein the following conditional expression is satisfied;

$$1.9 < BF_\infty/f_0 < 4 \qquad (5)$$

where $BF_\infty$ denotes the back focal length when focusing at infinity, and $f_0$ denotes the focal length of the whole lens system of the super wide-angle-lens.

15. A super wide-angle lens comprising, in order from an object;

a divergent lens group having negative refractive power; and a convergent lens group having positive refractive power;

the divergent lens group having at least one aspherical negative lens;

wherein the aspherical negative lens satisfies the following conditional expression;

$$0 < \frac{(d_{\phi max} - d_0)/h_{max}}{(d_{30} - d_0)/h_{30}} < 3 \qquad (1)$$

where $d_0$ denotes the thickness of the aspherical lens along the optical axis (center thickness), $d_{\phi max}$ denotes the thickness of the aspherical lens parallel to the optical axis at the height of the maximum effective aperture on the image side surface, $d_{30}$ denotes the thickness of the aspherical lens parallel to the optical axis at the height of 30% of the maximum effective aperture when the maximum effective aperture on the image side surface is assumed to be 100%, $h_{max}$ denotes the maximum effective radius of the aspherical lens on the image side surface, $h_{30}$ denotes the 30% of the maximum effective radius of the aspherical lens when the maximum effective aperture on the image side surface is assumed to be 100%.

16. The super wide-angle lens according to claim 15; wherein the convergent lens group has at least one focusing lens group that moves while focusing at a near-distant object, and the following conditional expression is satisfied;

$$3 < f_x/f_0 < 12 \qquad (4)$$

where $f_x$ denotes the focal length of the focusing lens group, wherein when a plurality of focusing lens groups are there in the convergent lens group, $f_x$ denotes that of the focusing lens group having the shortest focal length, and $f_0$ denotes the focal length of the whole system of the super wide-angle lens.

17. A photographing apparatus equipped with the super wide-angle lens according to claim 16.

18. A photographing apparatus equipped with the super wide-angle lens according to claim 15.

19. The super wide-angle lens according to claim 15, wherein the following conditional expression is satisfied;

$$1.9 < BF_\infty/f_0 < 4 \qquad (5)$$

where $BF_\infty$ denotes the back focal length when focusing at infinity, and $f_0$ denotes the focal length of the whole lens system of the super wide-angle lens.

* * * * *